United States Patent [19]

Suzuki

[11] Patent Number: 5,706,283
[45] Date of Patent: Jan. 6, 1998

[54] RADIO COMMUNICATION SYSTEM IN WHICH BASE STATION TRANSMITS SIGNAL INDICATING WHETHER OR NOT MESSAGE IS VALID TO TERMINAL STATIONS

[75] Inventor: Akira Suzuki, Yokohama, Japan

[73] Assignee: Matsushita Electric Industrial Co., Ltd., Osaka, Japan

[21] Appl. No.: 272,228

[22] Filed: Jul. 8, 1994

[30] Foreign Application Priority Data

| Jul. 16, 1993 | [JP] | Japan | 5-199019 |
| Jul. 16, 1993 | [JP] | Japan | 5-199020 |

[51] Int. Cl.$^6$ ............................................. H04Q 7/18
[52] U.S. Cl. .................. 370/311; 370/313; 370/474; 340/825.44; 455/383
[58] Field of Search .................. 375/224; 455/38.3, 455/54.1, 70; 340/825.44; 370/85.6, 94.1, 311, 313, 474

[56] References Cited

U.S. PATENT DOCUMENTS

| 4,577,315 | 3/1986 | Otsuka | 455/38.3 |
| 4,961,073 | 10/1990 | Drapac et al. | 455/38.3 |
| 5,109,530 | 4/1992 | Stengel | 455/38.3 |
| 5,230,084 | 7/1993 | Nguyen | 455/38.3 |
| 5,384,564 | 1/1995 | Wycoff et al. | 455/38.3 |
| 5,384,793 | 1/1995 | Zinser | 371/69.1 |
| 5,537,097 | 7/1996 | Eriksson et al. | 455/38.3 |
| 5,542,116 | 7/1996 | Schellinger | 455/38.3 |

FOREIGN PATENT DOCUMENTS

| 5160917 | 6/1993 | Japan . |
| 5176044 | 7/1993 | Japan . |
| 646417 | 2/1994 | Japan . |

*Primary Examiner*—Melvin Marcelo
*Attorney, Agent, or Firm*—Spencer & Frank

[57] ABSTRACT

A valid bit generator of a base station generates a valid bit to be disposed at or near the top of a message to be transmitted. The valid bit is set to be inactive if the message can be ignored, or active if the message cannot be ignored. Upon reception of this message, a valid bit detector at each terminal station judges whether the valid bit of the received message is inactive or active. If the valid bit is inactive, a message analyzing process is immediately stopped, whereas if it is active, the message is received and analyzed to the end thereof.

21 Claims, 11 Drawing Sheets

PRIOR ART

RADIO COMMUNICATION SYSTEM IN WHICH BASE STATION TRANSMITS SIGNAL INDICATING WHETHER OR NOT MESSAGE IS VALID TO TERMINAL STATIONS

BACKGROUND OF THE INVENTION

1. Field of the Invention

The present invention relates to a radio communication system such as mobile phones and cellar phones using a battery as their power sources.

2. Description of the Related Art

In a conventional radio communication system of this type, for the communication of control data, a base station transmits a message formed by a plurality of bits to a terminal station or moving station, and the terminal station analyzes a received message.

Figure 1:
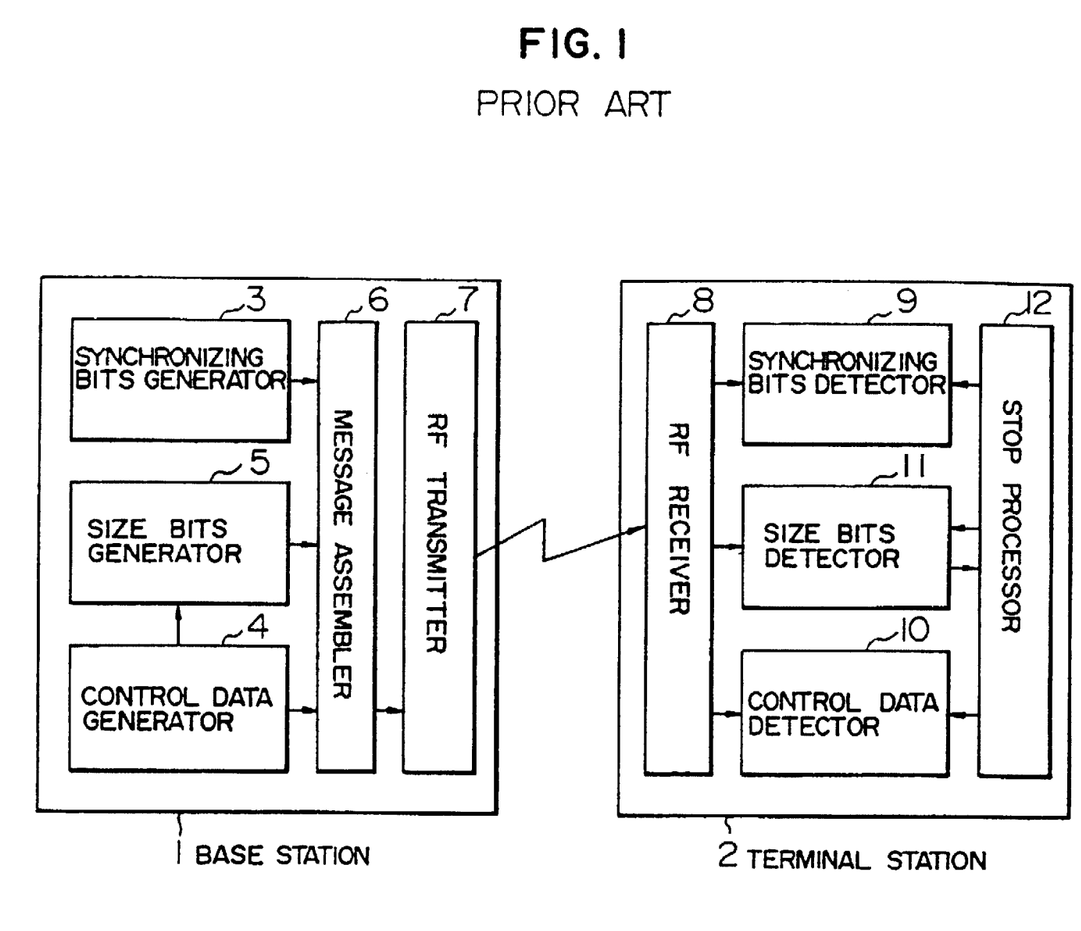
FIG. 1 is a block diagram showing an outline of the structure of a conventional control channel transmitter of a base station and a conventional control channel receiver at a terminal station.

FIG. 1 is a block diagram showing an outline of the structure of a control channel transmitter at a base station and a control channel receiver at a terminal station. A base station 1 includes a synchronizing bits generator 3 for generating synchronizing bits, a control data generator 4 for generating control data, a size bits generator 5 for generating size bits of a transmission message in accordance with the size of control data, a message assembler 6 for assembling the message by using the synchronizing bits, control data, and size bit, and an RF transmitter 7 for transmitting a digital signal message in the form of radio waves.

A terminal station 2, which is a moving station, includes an RF receiver 8 for receiving radio waves from the base station 1 and converting them into a digital signal message, a synchronizing bits detector 9 for detecting the synchronizing bit from the received message to provide synchronization, a control data detector 10 for detecting control data from the received message and analyzing the contents of the control data, a size bit detector 11 for detecting the size bit for the received message and judging the size of the message, and a stop processor 12 for stopping the operation of each block of the terminal station 2 in response to the reception of a signal representing the end of the message supplied from the size bits detector 11.

Figure 2:
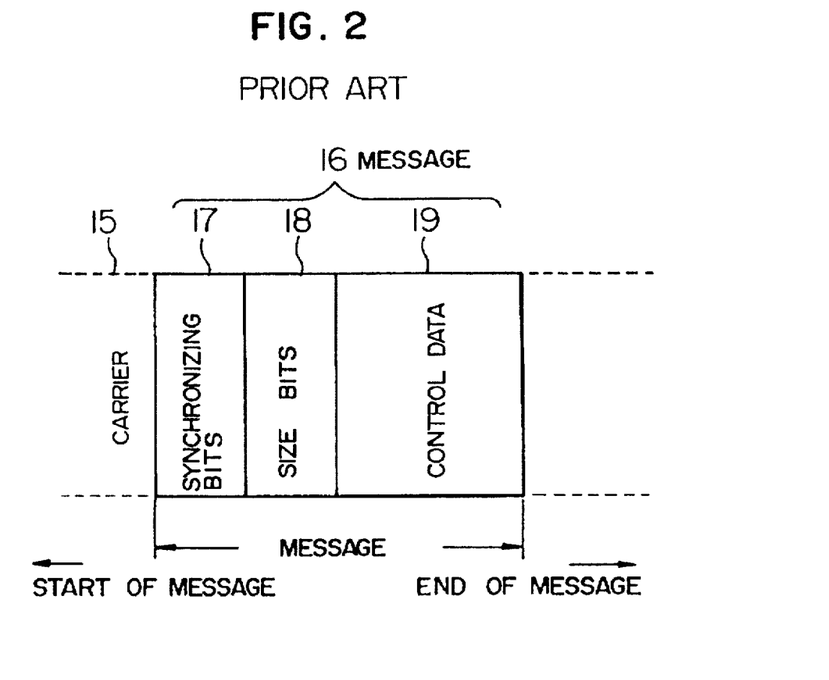
FIG. 2 is a schematic diagram showing the format of data on the control channel according to the prior art.

The operation of the conventional radio communication system constructed as indicated above will now be described. Referring to FIG. 2, the format of data to be transmitted from the base station 1 will be described. In FIG. 2, reference numeral 15 represents a carrier used as a control channel of radio waves, and reference numeral 16 represents a message transmitted on the control channel. A single message 16 is constructed of synchronizing bits 17 to be used for synchronization, size bits 18 representing the message size, control data 19 representing the contents of the message, and other data.

Figure 3:
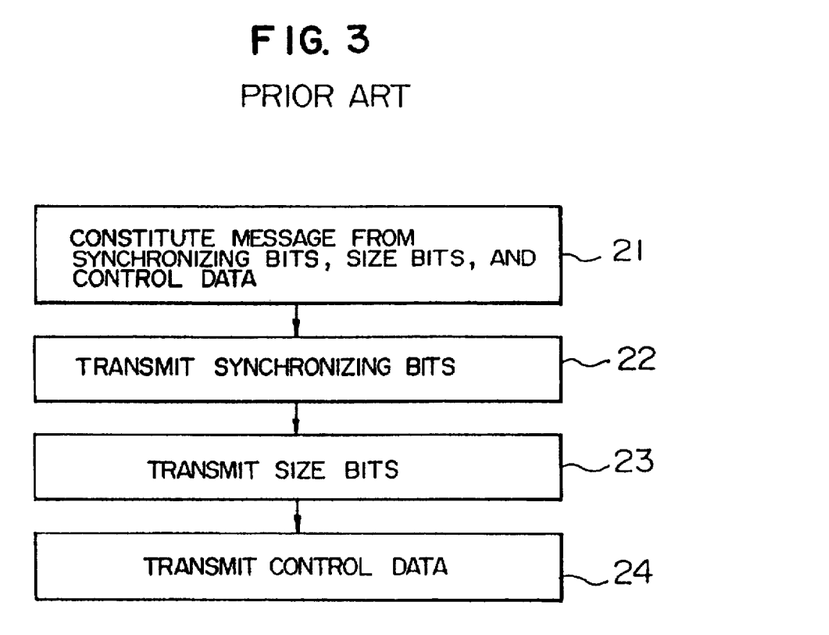
FIG. 3 is a flow chart explaining the operation of the conventional base station.

Next, the operation of the base station 1 and terminal station 2 will be described with reference to FIGS. 3 and 4. As shown in FIG. 3, at the base station 1, the synchronizing bits generator 3, control data generator 4, and size bits generator 5 generate synchronizing bits, control data, and size bits, respectively, the message assembler 6 assembles them in the order of the synchronizing bits, size bits, and control data (Step 21), and the RF transmitter 7 transmits them in the order described above (Steps 22, 23, and 24).

Figure 4:
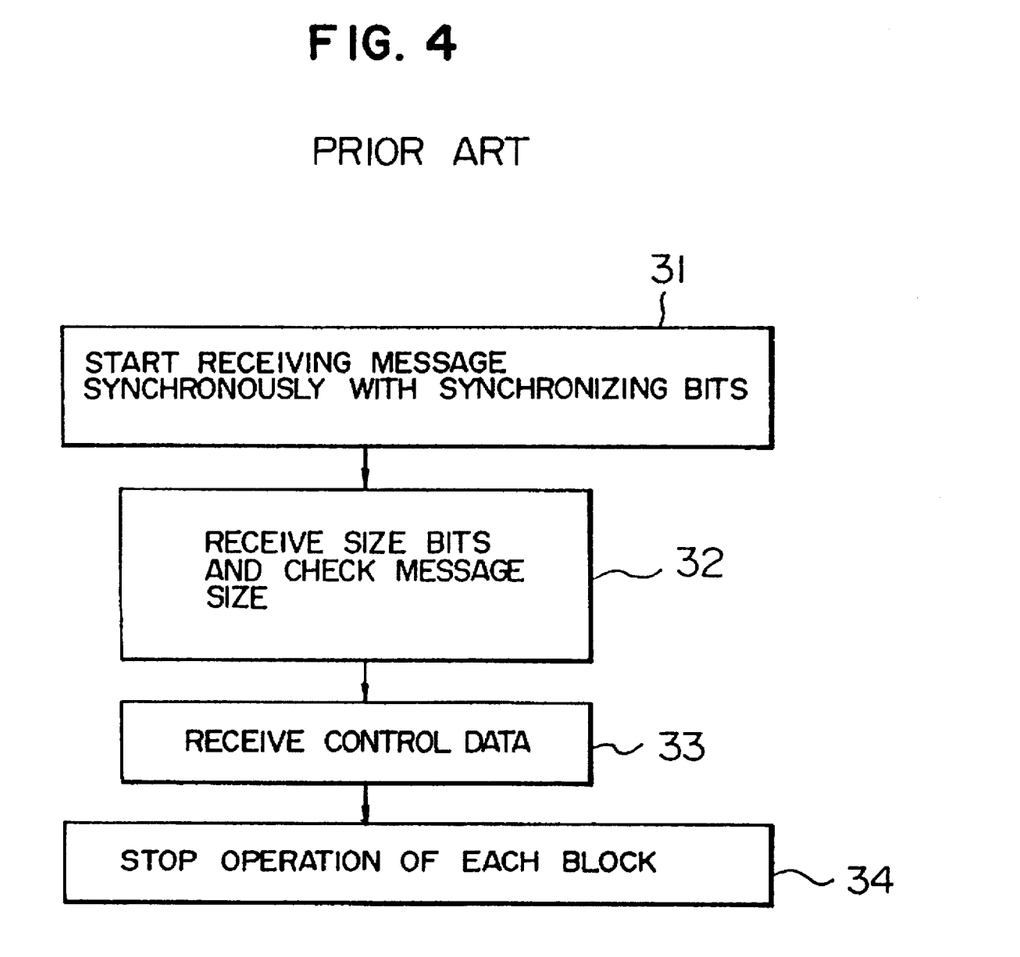
FIG. 4 is a flow chart explaining the operation of the conventional terminal station.

As shown in FIG. 4, at the terminal station 2, when the RF receiver 8 receives radio waves from the base station 1, the synchronizing bits detector 9 detects the synchronizing bits and starts receiving the message (Step 31). The size bit are detected from the received message to confirm the size of the message (Step 32). Thereafter, the control data is received and analyzed (Step 33). When the whole message has been received, the stop processor 12 stops the operation of each block and enters a standby state (Step 34).

With the above-described conventional system, a terminal station receiving a message can know whether the message can be ignored or not only after the end of the message has been received. Therefore, if the message can be ignored, it becomes apparent that the battery of the terminal station has been consumed wastefully during the time period required for receiving, processing, and analyzing the message. Of the various types of messages, there is a message which instructs an immediate stop of monitoring the control channel. In the case of such an immediate stop message, receiving the message to the end thereof is a wasteful consumption of the battery.

For a terminal station such as a cellar phone which is driven by a battery, it becomes a very important issue to make the standby period as long as possible while suppressing power consumption. Of messages which transmit parameters of the radio communication system, there are messages which can be ignored by all terminal stations, such as a message which is the same as the previous message and a message containing no parameter. If these messages are received and analyzed, precious power is consumed wastefully.

SUMMARY OF THE INVENTION

It is an object of the present invention to solve the conventional problems and provide a radio communication apparatus capable of elongating the standby period of terminal station while suppressing a wasteful consumption of the battery of the terminal station.

In order to achieve the above object of the present invention, a base station adds a valid bit at or near the top of a message. The valid bit is set to be inactive and transmitted if the message can be ignored, whereas the valid bit is set to be active and transmitted if the message cannot be ignored. A terminal station checks the valid bit contained in a received message so that it can select the proper succeeding process, including an immediate stop of analyzing the message.

With the radio communication system of the invention constructed as above, when the terminal station receives a message which includes the valid bit, it checks whether the valid bit has been set to be active or inactive, and if the valid bit has been set to be active, the terminal station continues the message analyzing process, whereas if the valid bit has been set to be inactive, the terminal station immediately stops the message analyzing process. In this manner, the wasteful use of the battery can be reduced.

DESCRIPTION OF THE PREFERRED EMBODIMENTS

Figure 5:
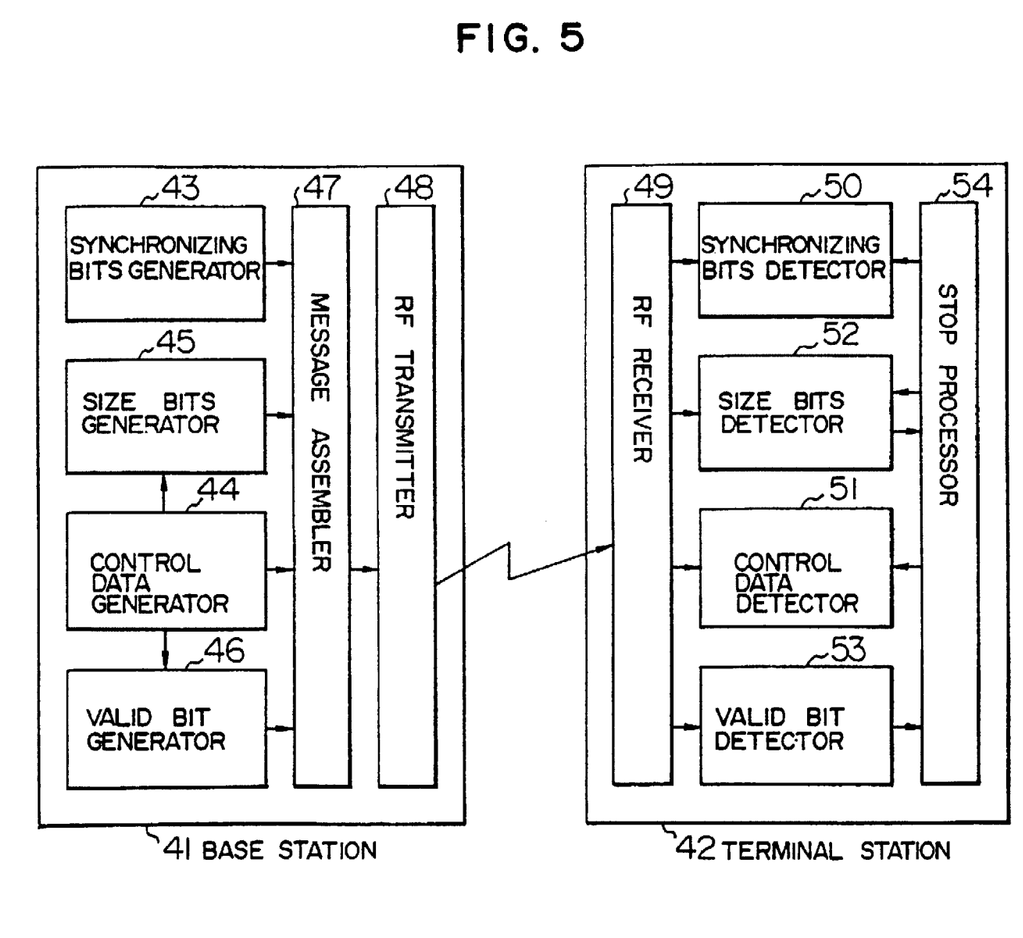
FIG. 5 is a block diagram showing an outline of the structure of a control channel transmitter of a base station and a control channel receiver at a terminal station according to a first embodiment of the present invention.

FIG. 5 is a block diagram showing an outline of the structure of a control channel transmitter of a base station and a control channel receiver at a terminal station according to a first embodiment of the present invention. In FIG. 5, reference 41 represents the base station, and reference numeral 42 represents the terminal station, which is a moving station. The base station 41 includes a synchronizing bits generator 43 for generating synchronizing bits, a control data generator 44 for generating control data, a size bits generator 45 for generating size bits of a transmission message in accordance with the size of control data, a valid bit generator 46 for setting a valid bit to be active or inactive in accordance with the contents of the control data, a message assembler 47 for assembling the message by using the synchronizing bits, valid bit, control data, and size bits, and an RF transmitter 48 for transmitting a digital signal message in the form of radio waves.

The terminal station 42 includes an RF receiver 49 for receiving radio waves from the base station 41 and converting them into a digital signal message, a synchronizing bits detector 50 for detecting the synchronizing bit from the received message to provide synchronization, the control data detector 51 for detecting control data in the received message and analyzing the contents of the control data, a size bits detector 52 for detecting a size bits from the received message and judging the size of the message, a valid bit detector 53 for detecting the valid bit from the received message, checking whether the valid bit has been set to be active or inactive, and selecting the succeeding process, and a stop processor 54 for stopping the operation of each block of the terminal station in response to the reception of a signal representing the message supplied from the size bit detector 52.

Figure 6:
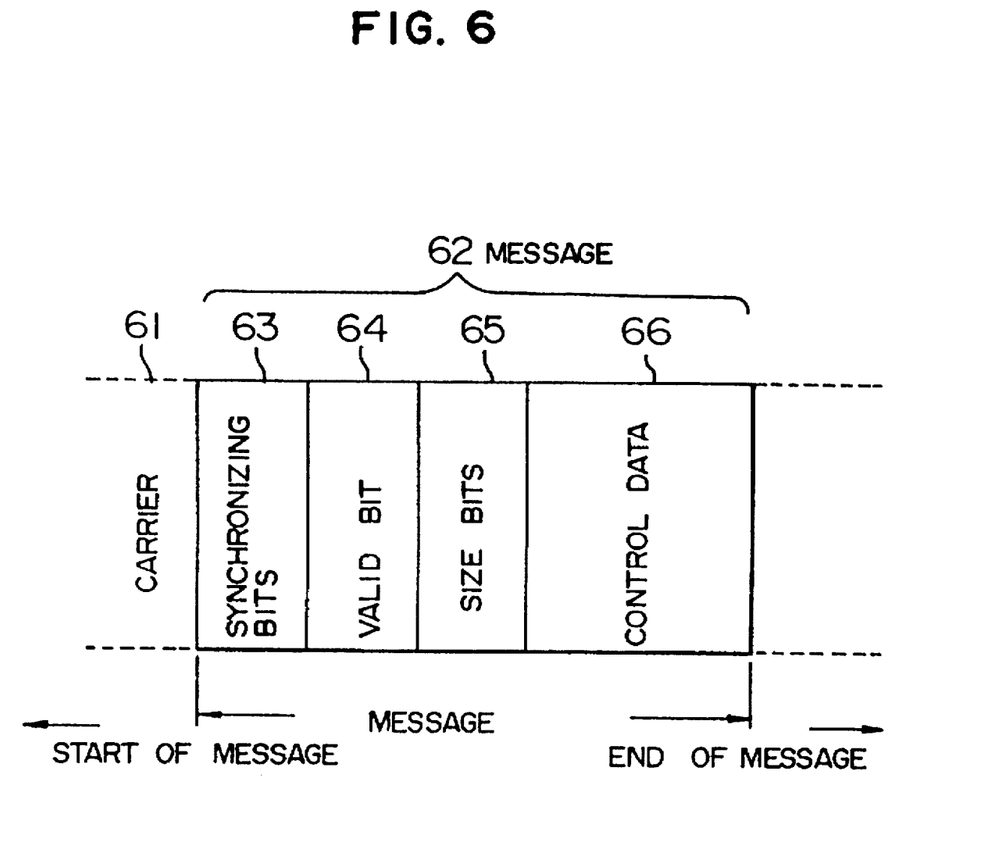
FIG. 6 is a schematic diagram showing the format of data on the control channel of the first embodiment.

The operation of the first embodiment constructed as indicated above will now be described. Referring first to FIG. 6, the format of data to be transmitted from the base station 41 will be described. In FIG. 6, reference numeral 61 represents a carrier used as a control channel of radio waves, and reference numeral 62 represents a message transmitted on the control channel. A single message 62 is constructed of synchronizing bits 63 to be used for message synchronization, a valid bit 64 representing whether the control data can be ignored or not, size bits 65 representing a message size, control data 66 representing the contents of the message, and other data.

Figure 7:
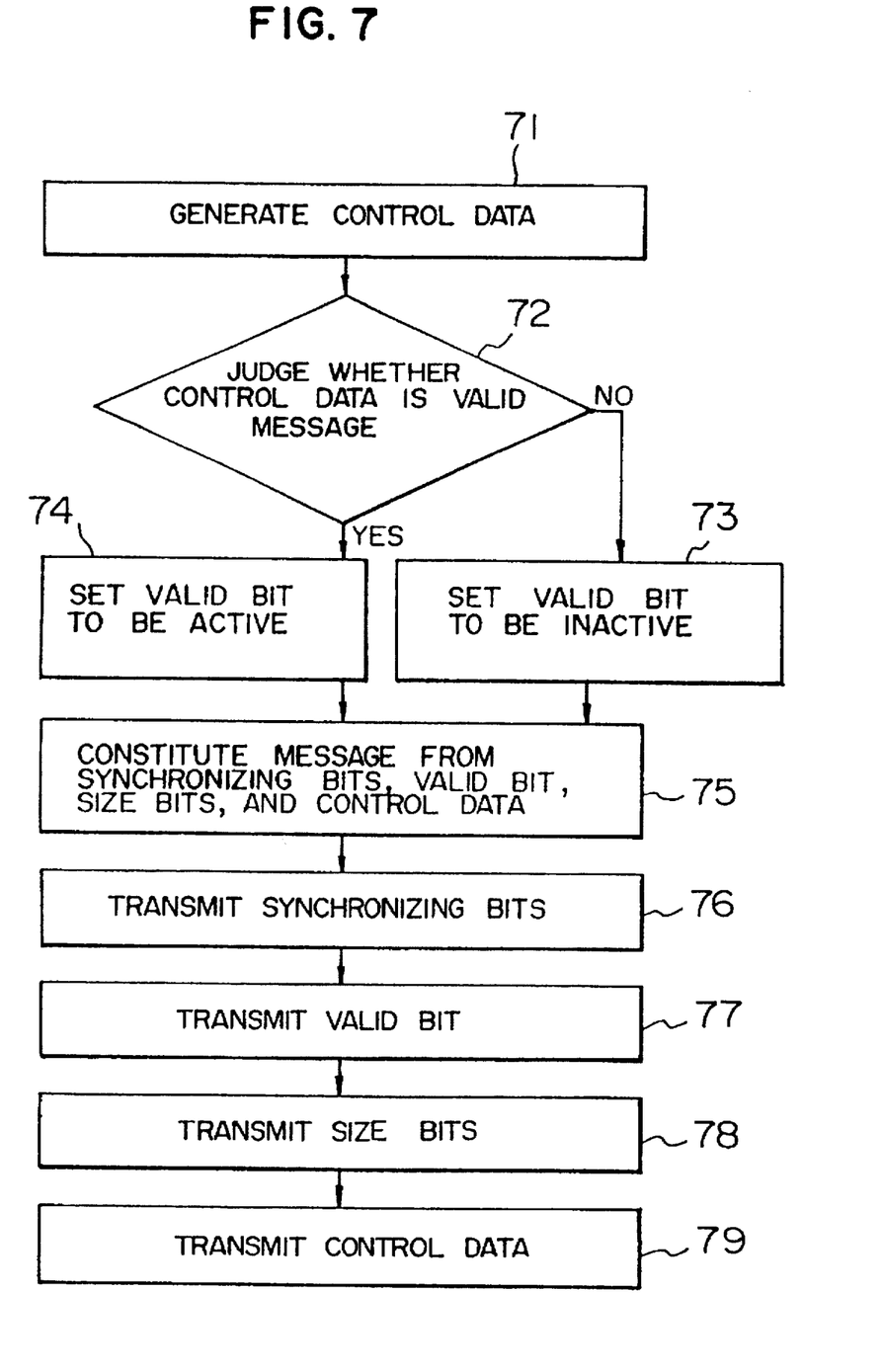
FIG. 7 is a flow chart explaining the operation of the base station of the first embodiment.

Next, the operation of the base station 41 and terminal station 42 will be described with reference to FIGS. 7 and 8. As shown in FIG. 7, at the base station 41, control is generated in a Step 71. The valid bits generator 46 judges whether the control data is a valid message not to be ignored by all terminal stations (Step 72). If the message can be ignored, the valid bit is set to be inactive (Step 73), whereas if the message cannot be ignored, the valid bit is set to be active (Step 74). The message assembler 47 assembles the synchronizing bit, valid bits, size bit, and control data generated by the respective generators in this order (Step 75), and the RF transmitter 48 transmits them in the order described above (Steps 76, 77, 78, and 79).

Figure 8:
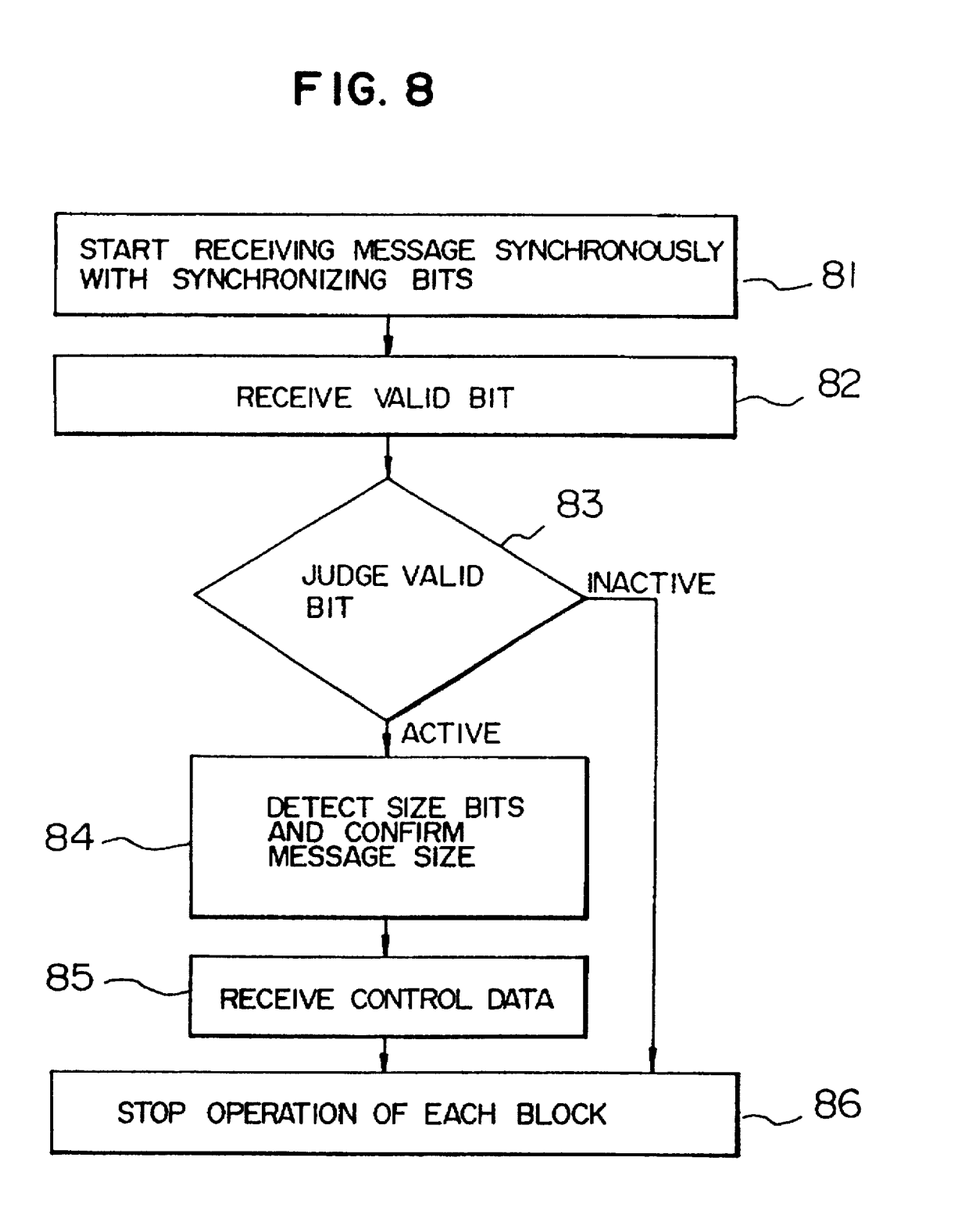
FIG. 8 is a flow chart explaining the operation of the terminal station of the first embodiment.

As shown in FIG. 8, at the terminal station 42, when the RF receiver 49 receives radio waves from the base station 41, the synchronizing bits detector 50 detects the synchronizing bit and starts receiving the message (Step 81). The valid bit detector 53 detects the valid bit from the received message (Step 82) and judges whether the valid bit has been set to be active or inactive (Step 83). If the valid bit is inactive, the stop processor 54 stops the operation of each block (Step 86). If the valid bit is active, the size bit detector 52 detects the size bits and confirms the size of the message (Step 84). Thereafter, the control data is received and analyzed (Step 85). When the whole message has been received, the stop processor 54 stops the operation of each block and enters a standby state (Step 86).

With the above-described first embodiment system, the valid bit generator 46 provided in the base station 41 sets the valid bit to be inactive if the message to be transmitted is a message which can be ignored by all terminal stations, and sets the valid bit to be active if the message to be transmitted is a message which cannot be ignored. At each terminal station 42, a transmitted valid bit is judged by the valid bit detector 53. If the valid bit is inactive, a message analyzing process is stopped immediately, whereas if the valid bit is active, the message is received and analyzed to the end thereof. It is therefore possible to suppress the wasteful consumption of the battery and elongate the standby period.

Even if the valid bit is inactive, the terminal station receiving this inactive valid bit may receive and analyze the message to the end thereof, without immediately performing a message analyzing stop process. Upon reception of a message transmitting the parameters of the communication system which is the same as the previous message, a terminal station is adapted to select its process as desired, either to perform the immediate stop or not. The latter case occurs when the terminal station is set up after it has not been operated for a long time, when a system error has occurred and the message is required to be confirmed again, or when it becomes necessary from other reasons.

In the first embodiment, the valid bit generated at the base station 41 may be repeated to form a bit train, e.g., nine bits. In the case of a message which can be ignored, all bits are set to be inactive (e.g., 0), and in the case of a message which cannot be ignored, all bits are set to be active (e.g., 1). Each terminal station 42 judges whether the valid bit is inactive or active, based upon whether the number of 0's or 1's received is equal to, or larger than half (e.g., 5 or larger) of the number of 0's or 1's of the original bits. In this manner, an error during communication can be avoided, thereby improving the reliability.

Figure 9:
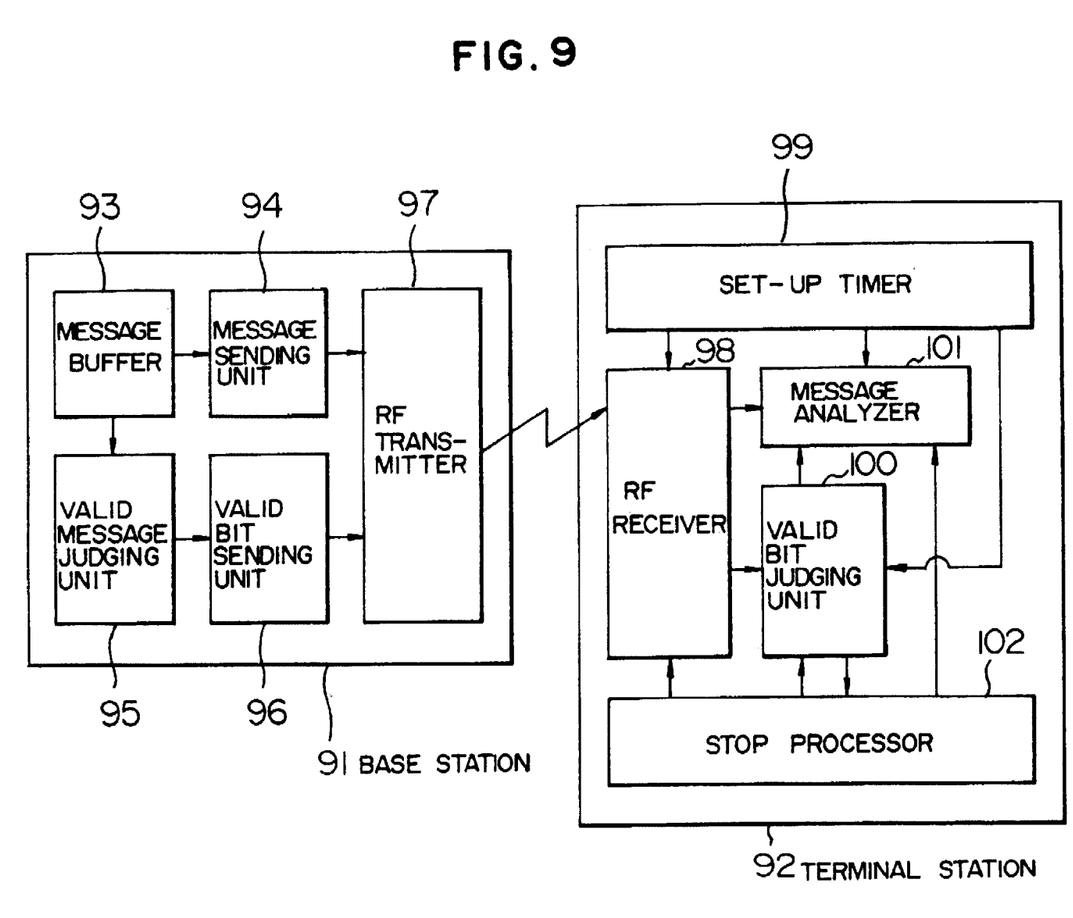
FIG. 9 is a block diagram showing an outline of the structure of a control channel transmitter of a base station and a control channel receiver at a terminal station according to a second embodiment of the present invention.

FIG. 9 is the block diagram showing the outline of the structure of a control channel transmitter of a base station and a control channel receiver at a terminal station according to a second embodiment of the present invention. In FIG. 9, a message buffer 93 provided in the base station 91 stores a message to be transmitted in one slot. A message sending unit 94 sequentially sends messages stored in the message buffer 93 one message after another to an RF transmitter 97. A valid message judging unit 95 judges whether there is a valid message in the message buffer 93. A valid bit sending unit 96 sets a valid bit to be active if there is a valid message in the message buffer 93, and sets the valid bit to be inactive if there is no valid message in the message buffer 93, the valid bit being sent to the RF transmitter 97. The RF transmitter 97 assembles the message by adding the valid bit to the top of the message, converts the digital signal message into radio wave signals, and transmits them to terminal stations 92.

At a terminal station 92, which is a moving station, an RF receiver 98 receives radio waves from the base station 91 and converts them into a digital signal message. A set-up timer 99 sets up each block of the terminal station 92 when it becomes a slot time assigned to the terminal station 92. If the valid bit in the received slot is active, a valid bit judging unit 100 activates a message analyzer 101, whereas if it is inactive, a stop processor 102 is activated. The message analyzer 101 analyzes the message contained in the received slot. The stop processor 102 stops the operation of each block of the terminal station 92 if the slot time assigned to the terminal station 92 has lapsed or if a stop instruction is supplied from the valid bit judging unit 100.

Figure 10:
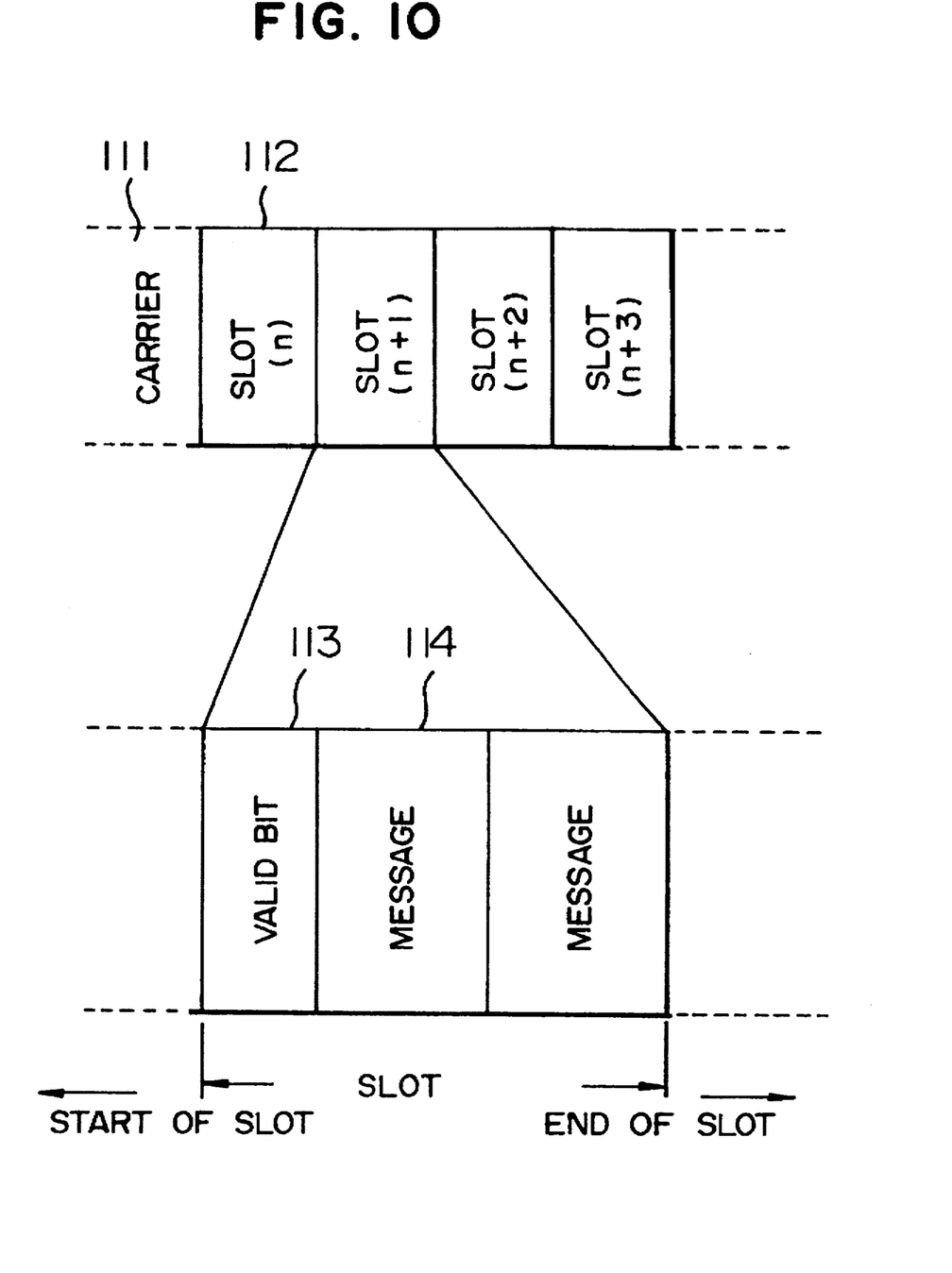
FIG. 10 is a schematic diagram showing the format of data on the control channel of the second embodiment.

The operation of the second embodiment constructed as indicated above will now be described. Referring first to FIG. 10, the format of data to be transmitted from the base station 91 will be described. In FIG. 10, reference numeral 111 represents a carrier used as a control channel of radio waves, and reference numeral 112 represents slots defined by dividing the carrier 111 is to predetermined time intervals. Reference numeral 113 represents a valid bit added to the top of one of the slots 112, and reference numeral 114 represents a message placed after the valid bit 113.

Figure 11:
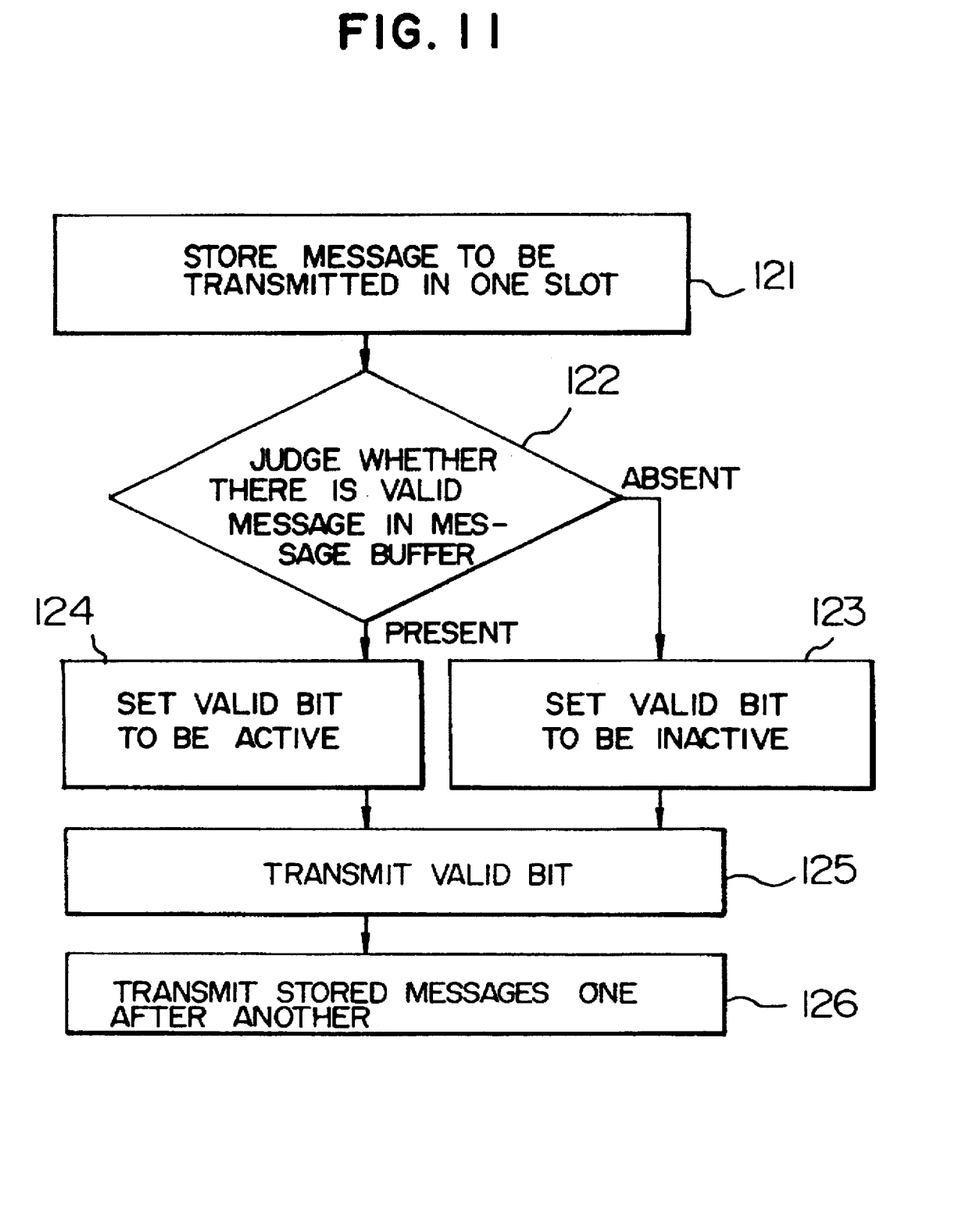
FIG. 11 is a flow chart explaining the operation of the base station of the second embodiment.

Next, the operation of the base station 91 and terminal station 92 will be described with reference to FIGS. 11 and 12. As shown in FIG. 11, at the base station 91, the message buffer 93 stores a message to be transmitted in one slot (Step 121). The valid message judging unit 95 judges whether or not there is a valid message in the message buffer 93 (Step 122). If not, the valid bit is set to be inactive (Step 123), whereas if a valid message is present, the valid bit is set to be active (Step 124). With the help of the valid bit sending unit 96, the valid bit is added to the top of the slot and transmitted (Step 125). With the help of the message sending unit 94, messages stored in the message buffer 93 are sequentially transmitted one message after another from the RF transmitter 99 (Step 126).

Figure 12:
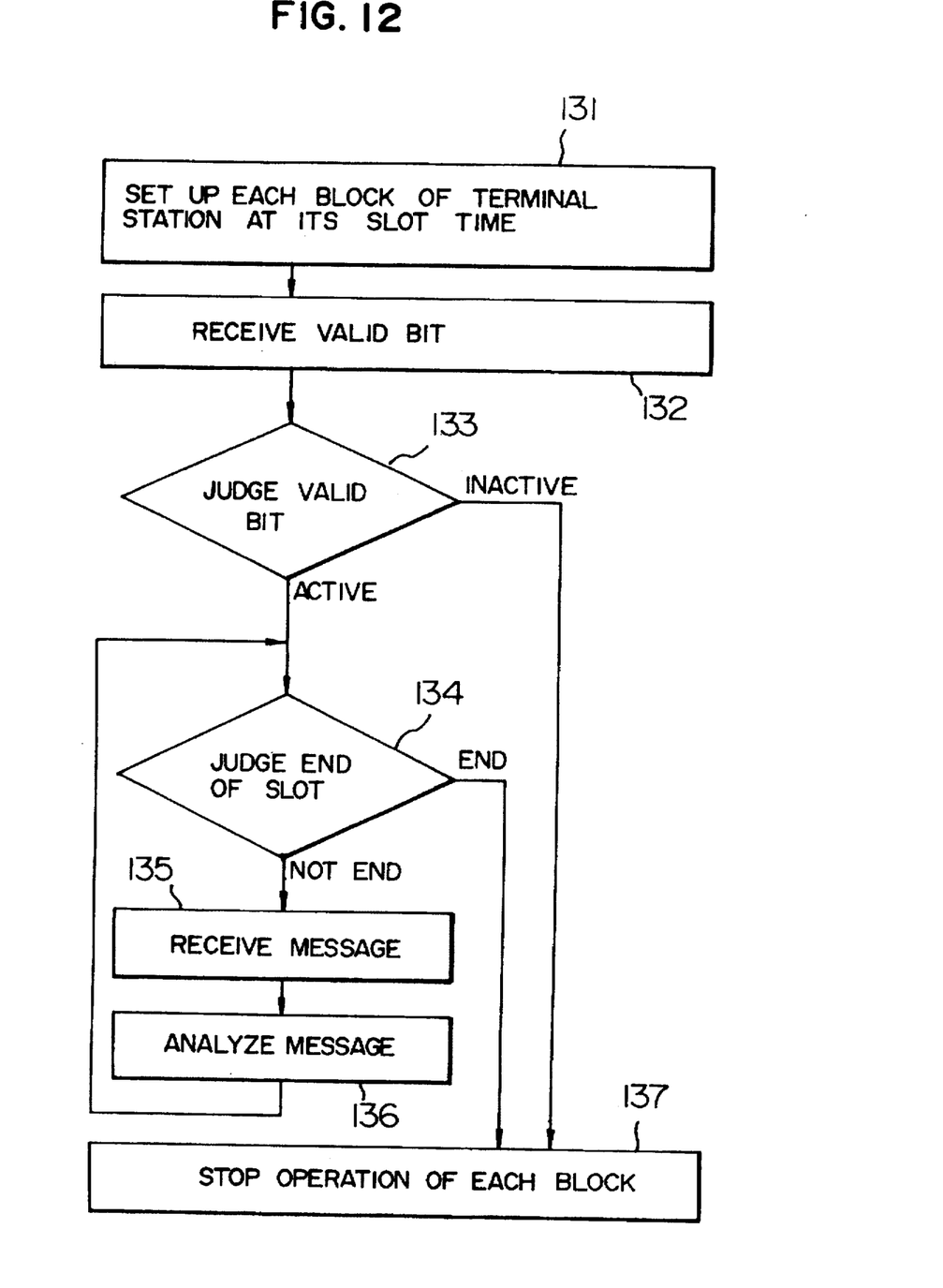
FIG. 12 is a flow chart explaining the operation of the terminal station of the second embodiment.

As shown in FIG. 12, at the terminal station 92, when the time of the set-up timer 99 becomes the slot time assigned to the terminal station 92, each block of the terminal station 92 is set up (Step 131). The valid bit in the slot transmitted from the base station 91 is received by the RF receiver 98 (Step 132). The valid bit judging unit 100 judges the contents of the valid bit (Step 133). If the valid bit is inactive, the operation of each block of the terminal station 92 is immediately stopped (Step 137), whereas if the valid bit is active, the message is received until the slot time lapses (Step 134, 135), and analyzed (Step 136). When the slot time lapses, the operation of each block is stopped (Step 137).

With the above-described second embodiment system, the base station 91 is provided with the valid message judging unit 95 and valid bit sending unit 96. The valid bit is set to be inactive if the message to be transmitted is a message which can be ignored by all terminal stations, and is set to be active if the message to be transmitted is a message which cannot be ignored. At each terminal station 92, a transmitted valid bit is judged by the valid bit judging unit 100. If the valid bit is inactive, a message analyzing process is stopped immediately, whereas if the valid bit is active, the message is received and analyzed to the end thereof. It is therefore possible to suppress wasteful consumption of the battery and elongate the standby period.

Even if the valid bit is inactive, the terminal station receiving this inactive valid bit may receive and analyze the message to the end thereof, without immediately performing a message analyzing stop process. Upon reception of a message transmitting the parameters of the communication system which is the same as the previous message, a terminal station is adapted to select its process either to perform the immediate stop or not. The latter case occurs when the terminal station is set up after it has not been operated for a long time, when a system error has occurred and the message is required to be confirmed again, or when it becomes necessary from other reasons.

Also in the second embodiment, the valid bit generated at the base station 91 may be repeated to form a bit train, e.g., nine bits. In the case of a message which can be ignored, all bits are set to be inactive (e.g., 0), and in the case of a message which cannot be ignored, all bits are set to be active (e.g., 1). Each terminal station 92 judges whether the valid bit is inactive or active, based upon whether the number of 0's or 1's received is equal to, or larger than, half (e.g., 5 or larger) of the number of 0's or 1's of the original bits. In this manner, an error of during communications can be avoided, thereby improving the reliability.

What is claimed is:

1. A radio communication system, comprising:

a base station;

a terminal station;

means provided in said base station for adding a valid bit in a message to be transmitted to said terminal station, setting said valid bit to be inactive if said message is to be ignored by said terminal station, setting said valid bit to be active if said message is not to be ignored by said terminal station, and transmitting said message, including said valid bit, to said terminal station, said message being constituted by a plurality of bits; and means provided in said terminal station for receiving said message which includes said valid bit, judging whether said valid bit included in said received message is inactive or active, and processing said received message only if said included valid bit is active.

2. A radio communication system according to claim 1, wherein:

said means provided in said base station includes means for repeating said valid bit to provide a train of valid bits which are included in the message that is transmitted, all of the bits in said train of valid bits being set to be inactive if said message is to be ignored by said terminal station and being set to be active if said message is not to be ignored by said terminal station, and said means provided in said terminal station includes means for judging whether the number of active bits in the train of valid bits that is received by said terminal station is equal to, or larger than, half of the number of bits in the train of valid bits that was transmitted from said base station, said received message being processed only if the number of active bits is equal to, or larger than, half of the number of bits in the train of valid bits that was transmitted.

3. A radio communication system in which a control channel is monitored dispersively and periodically only during a time called a slot, comprising;

a base station;

a terminal station;

means provided in said base station for inserting a valid bit and a plurality of messages in a slot assigned to the terminal station, setting said valid bit to be inactive if all said messages are to be ignored by said terminal station, setting said valid bit to be active if at least one of said messages is not to be ignored by said terminal station, and transmitting said valid bit and said plurality of messages to said terminal station during the assigned slot; and means provided in said terminal station for receiving said valid bit and said plurality of messages during the assigned slot, judging whether said received valid bit is inactive or active, and processing said received messages only if said received valid bit is active.

4. A radio communication system according to claim 3, wherein:

said means provided in said base station includes means for repeating said valid bit to provide a train of valid bits which are transmitted during the assigned slot along with said messages, all of the bits in said train of valid bits being set to be inactive if all of said messages are to be ignored by said terminal station and being set to be active if at least one message is not to be ignored by said terminal station, and said means provided in said terminal station includes means for judging whether the number of active bits in the train of valid bits is equal to, or larger than, half of the number of bits in said train of valid bits transmitted from said base station, said received message being processed only if the number of active bits is equal to, or larger than, half of the number of bits in the train of valid bits that was transmitted.

5. A terminal station for use with a base station which transmits a valid bit along with at least one message to the terminal station, the valid bit having either an active state or an inactive state, said terminal station comprising;

means for receiving the valid bit and the at least one message;

means for determining whether the state of the valid bit is active or inactive; and processing means for processing the at least one message, the processing means including means for stopping the processing of the at least one message if the state of the valid bit is determined to be inactive.

6. A terminal station according to claim 5, wherein the base station transmits the valid bit along with the at least one message during a time slot assigned to the terminal station, and wherein the terminal station further comprises set-up timer means for actuating the means for receiving during the assigned time slot.

7. A terminal station for use with a base station which transmits a train of valid bits along with at least one message to the terminal station, each valid bit having either an active state or an inactive state and all of the valid bits in the transmitted train of valid bits having the same state, said terminal station comprising:

means for receiving the train of valid bits and the at least one message;

means for determining whether the number of active valid bits in the received train of valid bits is equal to or greater than a predetermined percentage of the number of valid bits in the transmitted train of valid bits; and processing means for processing the at least one message, the processing means including means for stopping the processing of the at least one message if the number of active valid bits in the received train of valid bits is less than the predetermined percentage of the number of valid bits in the transmitted train of valid bits.

8. A terminal station according to claim 7, wherein the predetermined percentage is 50%.

9. A terminal station according to claim 7, wherein the base station transmits the train of valid bits along with the at least one message during a time slot assigned to the terminal station, and wherein the terminal station further comprises set-up timer means for actuating the means for receiving during the assigned time slot.

10. A radio communication system according to claim 1, wherein said means provided in said terminal station comprises means for placing said terminal station in a power-saving standby state if said included valid bit is inactive.

11. A radio communication system according to claim 3, wherein the assigned slot has a slot duration, and wherein said means provided in said terminal station comprises means for placing said terminal station in a power-saving standby state before the slot duration has elapsed if the received valid bit is inactive.

12. A terminal station according to claim 6, wherein the time slot assigned to the terminal station has a slot duration, and wherein the means for stopping the processing comprises means for placing the terminal station in a power-saving standby state before the slot duration has elapsed if the state of the valid bit is determined to be inactive.

13. A terminal station according to claim 9, wherein the time slot assigned to the terminal station has a slot duration, and wherein the means for stopping the processing comprises means for placing the terminal station in a power-saving standby state before the slot duration has elapsed if the number of active valid bits in the received train of valid bits is less than the predetermined percentage.

14. A radio communication system according to claim 1, wherein:

said message comprises control data;

said means provided in said base station comprises means for transmitting said message on a control channel, without addressing said terminal device, during a time slot; and wherein said means provided said terminal station comprises means for monitoring said time slot.

15. A radio communication system according to claim 14, further comprising another terminal device, the another terminal device being provided with means for monitoring said time slot without being addressed, receiving said message which includes said valid bit, judging whether said valid bit included in said received message is inactive or active, and processing said received message only if said included valid bit is active.

16. A radio communication system according to claim 3, wherein:

said plurality of messages comprise control data; and said means provided in said base station comprises means for transmitting said valid bit and said plurality of messages during the assigned slot without addressing said terminal station.

17. A radio communication system according to claim 16, further comprising another terminal station, the another terminal station being provided with means for receiving said valid bit and said plurality of messages during the assigned slot without being addressed, judging whether said received valid bit is inactive or active, and processing said received message only if said received valid bit is active.

18. A terminal station according to claim 6, wherein the at least one message comprises control data which the base station transmits on a control channel during the time slot without addressing the terminal station.

19. A terminal station according to claim 18, wherein the time slot assigned to the terminal station is not assigned uniquely to the terminal station, and is instead commonly assigned to the terminal station and at least one further terminal station.

20. A terminal station according to claim 7, wherein the at least one message comprises control data which the base station transmit on a control channel during the time slot without addressing the terminal station.

21. A terminal station according to claim 20, wherein the time slot assigned to the terminal station is not assigned uniquely to the terminal station, and is instead commonly assigned to the terminal station and at least one further terminal station.

* * * * *